(12) United States Patent
Heinz

(10) Patent No.: US 7,114,210 B2
(45) Date of Patent: Oct. 3, 2006

(54) RAMP AND METHOD OF CONSTRUCTION

(76) Inventor: Richard N. Heinz, 8506 M-5 Rd., Gladstone, MI (US) 49837

( * ) Notice: Subject to any disclaimer, the term of this patent is extended or adjusted under 35 U.S.C. 154(b) by 0 days.

(21) Appl. No.: 11/197,758

(22) Filed: Aug. 3, 2005

(65) Prior Publication Data

US 2006/0027794 A1 Feb. 9, 2006

Related U.S. Application Data

(60) Provisional application No. 60/598,734, filed on Aug. 3, 2004.

(51) Int. Cl.
*E01D 1/00* (2006.01)
(52) U.S. Cl. .......................... 14/69.5; 254/88
(58) Field of Classification Search ................ 14/69.5, 14/71.1; 472/88–90; 254/88
See application file for complete search history.

(56) References Cited

U.S. PATENT DOCUMENTS

| | | | | |
|---|---|---|---|---|
| 5,341,533 A | * | 8/1994 | Seitz ............................ | 14/69.5 |
| 5,483,715 A | * | 1/1996 | Fogarty et al. ............... | 14/69.5 |
| 5,599,235 A | * | 2/1997 | Lynberg ....................... | 472/89 |
| 5,894,618 A | * | 4/1999 | Jacobsen et al. ............. | 14/69.5 |
| 5,946,756 A | * | 9/1999 | Mapp .......................... | 14/69.5 |
| 6,044,511 A | * | 4/2000 | Frost et al. .................. | 14/69.5 |
| 6,551,192 B1 | * | 4/2003 | Rieber et al. ................ | 472/88 |
| RE38,326 E | * | 11/2003 | Mapp .......................... | 14/69.5 |
| 6,775,955 B1 | * | 8/2004 | Smith et al. .................. | 53/141 |
| D500,113 S | * | 12/2004 | Frey et al. ................. | D21/817 |
| D503,139 S | * | 3/2005 | Colak et al. ............... | D12/217 |
| 7,003,836 B1 | * | 2/2006 | Berg ........................... | 14/69.5 |
| 2001/0044978 A1 | * | 11/2001 | Ware .......................... | 14/69.5 |

* cited by examiner

*Primary Examiner*—Raymond Addie
(74) *Attorney, Agent, or Firm*—John R. Benefiel

(57) ABSTRACT

A ramp constructed of an expanded plastic foam parallelepiped core encased in a thick coating of polyurea provides a lightweight, stable ramp suitable for vehicle servicing. A low angle, long length ramp of a low weight is provided. Heavy duty versions have on edge panels embedded in the core.

10 Claims, 2 Drawing Sheets

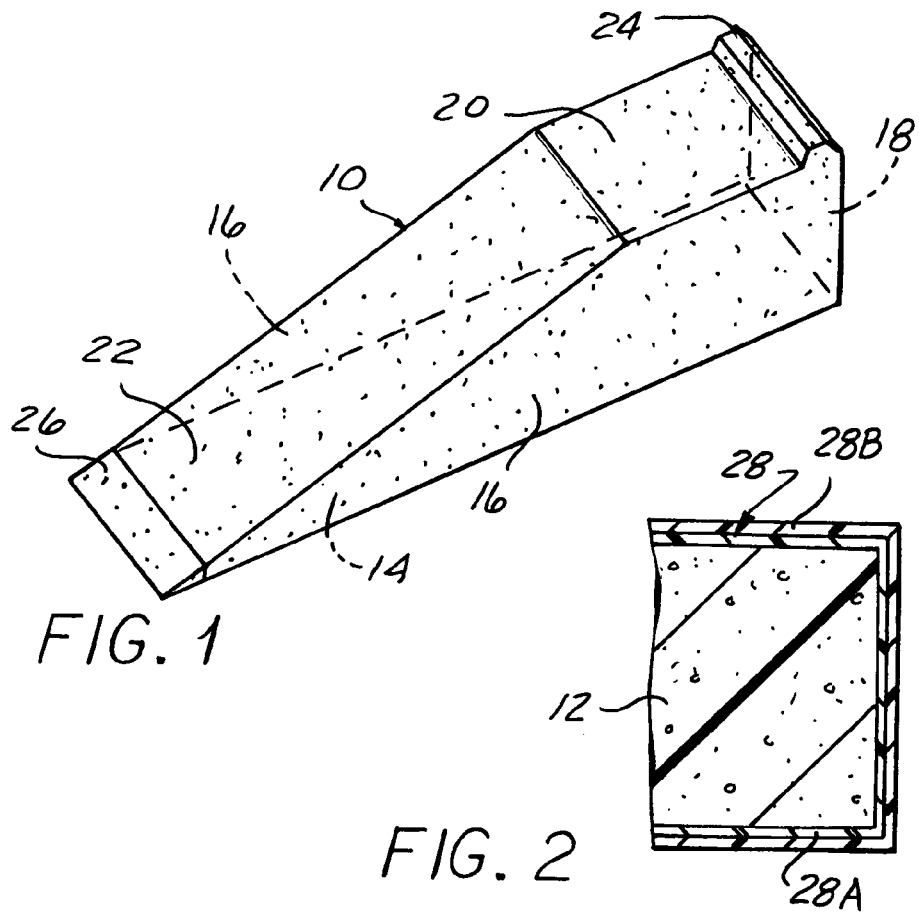
FIG. 1
FIG. 2
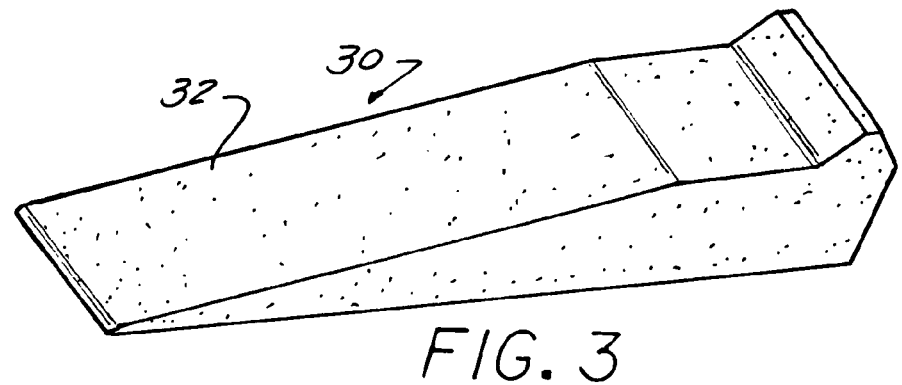
FIG. 3
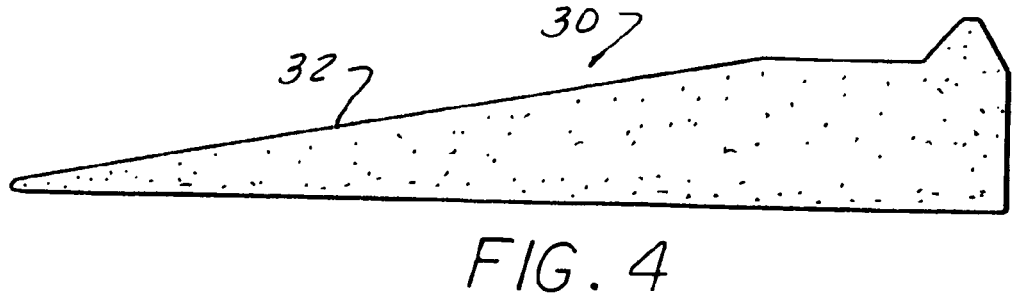
FIG. 4

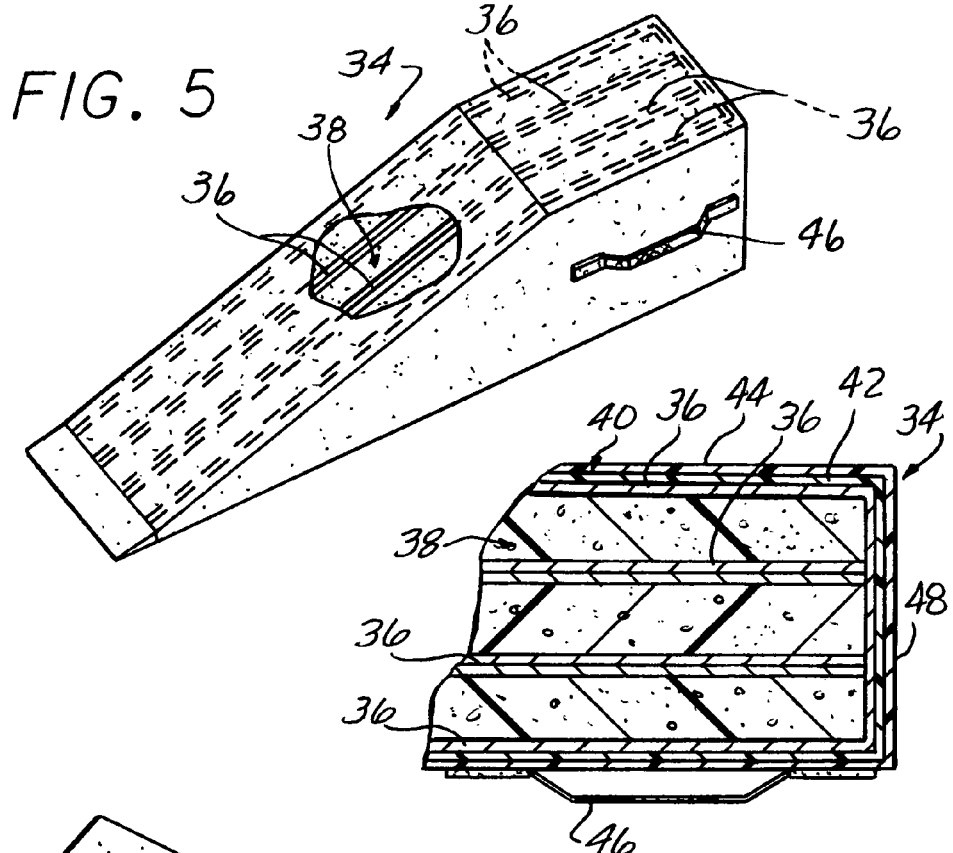
FIG. 5
FIG. 6
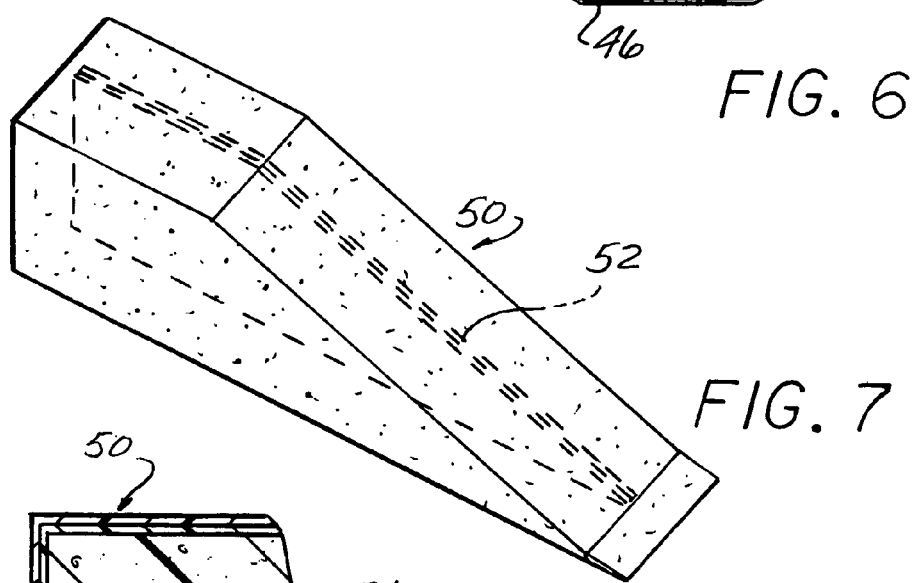
FIG. 7
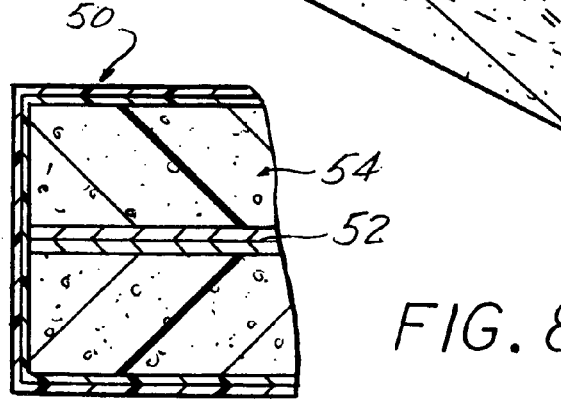
FIG. 8

RAMP AND METHOD OF CONSTRUCTION

CROSS REFERENCE TO RELATED

This application claims the benefit of U.S. provisional application No. 60/598,734 filed on Aug. 3, 2004.

BACKGROUND OF THE INVENTION

This invention concerns ramps which are commonly used to service motor vehicles by driving the vehicle up a pair of the ramps aligned with each wheel of the front or rear wheels of the vehicle.

Such ramps are typically constructed of formed steel which is painted. This produces a strong, economical ramp but the ramps are relatively heavy.

Another approach is to mold the ramps from plastic with internal webs extending between external walls of relatively thin width to achieve adequate strength. While lighter than steel, the plastic ramps are still heavy enough to not be easily handled.

In both cases, costly tooling is required for each configuration of the ramp, which could be made in a number of configurations, as to be ideally suited for a particular vehicle type and for other uses, each configuration requiring costly tooling.

A problem is encountered when such ramps are to be used with low ground clearance sports cars, as the approach slope of conventional ramps is sufficiently steep that the front bumper will contact the ramp pushing the ramp away and preventing ascent of the wheels.

Such ramps could conceivably be made in many different configurations or even custom made for other uses if tooling costs could be greatly reduced or eliminated.

Another problem is the tendency for the bottom edges of the side walls of both steel and molded plastic ramps to sink into gravel or earth surfaces or to be easily tipped when attempted to be used. The edges of side walls of formed steel ramps can damage asphalt paving.

The side walls of plastic ramps can be easily collapsed if the ramp is misaligned with the vehicle wheels to a degree that the tires push the ramp sideways, bending the same such that the walls collapse under the weight of the vehicle.

It is the object of the present invention to provide a ramp construction which provides a light weight but durable and stable ramp useable on softer surfaces and which can economically be made in many different configurations.

SUMMARY OF THE INVENTION

The above recited object and other objects which will be appreciated upon a reading of the following specification and claims are achieved by a ramp having a solid block core of a parallelepiped shape with an angled ramp front surface, constructed as a lightweight composite comprised of an expanded foam plastic core, in particular, a low density expanded polystyrene foam which is encapsulated in a high tensile strength polyurea coating of sufficient thickness to provide a durable surface when cured and create a strong composite structure. The polyurea coating is preferably applied by spraying liquid components onto the foam plastic core so as to create a textured surface for good tire traction. The combination of the core and high tensile strength polyurea coating creates a sufficiently strong and durable structure to be very well suited for use as a vehicle service ramp.

The block core can be easily and economically cut out in a great variety of shapes without requiring special tooling, with the polyurea thereafter applied as a coating as by spraying the block core to allow ramps of many configurations to be manufactured without incurring significant tooling costs. Very low angle approach ramps can be easily provided which are lightweight so as to be practical to use despite being of relatively long length. The solid footprint of the ramps of this construction creates a stable ramp which has a much reduced tendency to sink into soft surfaces.

For heavier duty designs, additional strengthening features can be employed to resist compressive loads. This may include one or more panels of plywood or other sturdy material such as plastic or heavy cardboard, oriented on edge within the core, braced by the presence of the expanded polystyrene foam of the cove encasing the panels.

The polyurea coating may optionally be top coated with a hard coat of an abrasion and water resistant color stable polyurea formulation.

DESCRIPTION OF THE DRAWINGS

FIG. 1 is a pictorial view of a basic ramp according to the present invention.

FIG. 2 is fragmentary view of a section of the ramp shown in FIG. 1.

FIG. 3 is a pictorial view of a ramp of a low angle, long length configuration with a tire stop feature on the top surface.

FIG. 4 is a side elevational view of the ramp shown in FIG. 3.

FIG. 5 is a pictorial view of a heavy duty embodiment of the ramp according to the invention with a portion of the coatings broken away to show the core construction.

FIG. 6 is an enlarged sectional view of a fragmentary portion of the ramp shown in FIG. 5.

FIG. 7 is a pictorial view of an intermediate duty ramp according to the invention.

FIG. 8 is an enlarged sectional view of a fragmentary portion of the ramp shown in FIG. 7.

DETAILED DESCRIPTION

In the following detailed description, certain specific terminology will be employed for the sake of clarity and a particular embodiment described in accordance with the requirements of 35 USC §112, but it is to be understood that the same is not intended to be limiting and should not be so construed inasmuch as the invention is capable of taking many forms and variations within the scope of the appended claims.

Referring to the drawings, and particularly FIGS. 1 and 2, a light duty general purpose ramp 10 according to the present invention is constructed of a core 12 comprised of a parallelepiped block of a plastic foam material preferably expanded polystyrene foam (EPS) of a density on the order of 1.5 to 6 pounds per cubic foot. The heavier densities of 5 or 6 pounds per cubic foot can be used for heavy duty ramps.

The block core and ramp 10 includes rectangular sides 16, a rear wall 18 and top face 20. An angled front surface 22 slopes up from the bottom side 14 to the top face 20. A tire stop 22 will normally be located to the rear of the top face 20.

The slope of the front face 22 is on the order of 16° (15.7° in one design) to accommodate the ground clearance of typical passenger cars. An entry lip 26 of plastic may optionally be included to provide a transition for the vertical end of the core 12 to ensure that the ramp 10 is not pushed away when a vehicle tire first contacts the same.

The core 12 is encased within a polyurea coating 28 which is preferably sprayed on so as to create a coating having a textured finished surface to enhance tire traction.

This polyurea coating which is sprayed onto the core is formulated and of sufficient thickness to develop adequate tensile strength so that the ramp 10 may accommodate the weight of passenger cars.

Polyurea may be formulated in a number of ways. A suitable type of polyurea is F1-2546 POLY available from VOLATILE FREE, INC. of Brookfield, Wis. 53045. The thickness of the polyurea coating will typically be on the order of 35–65 mils of this material. It will provide adequate tensile strength for most applications. Even thinner coatings may be adequate, as a tensile strength of 2500 psi is obtained with a 25 mil thickness of 58 (Shore D) hardness suitable for light duty applications.

A top coat may be applied such as Polyshield HM-7030 available from Specialty Products, Inc. which has a high degree of water resistance.

The ramp 10 so produced is very lightweight, and in fact will typically have positive buoyancy in water.

This construction allows a wide variety of ramp configurations, even custom ordered configurations, to be made very economically with minimal tooling costs.

Any configuration of core 12 can be simply cut out of EPS foam by standard cutting tools and then spray coated with polyurea to a suitable coating thickness.

The rectangular solid bottom 14 insures good stability and much reduced tendency to sink into soft surfaces. The absence of any nooks or crannies and the hard polyurea coating makes keeping the ramps clean easy.

FIGS. 3 and 4 show a second embodiment of a ramp 30, which has a very low angle ramp surface 32, i.e. on the order of 11°, and a much longer length, i.e. 60 inches or even longer, to allow use with very low ground clearance vehicles. The ramp weight will still be quite moderate despite the increased size, i.e., each ramp would only weigh about ten pounds.

FIGS. 5 and 6 show another embodiment of a ramp 34 according to the invention which is designed for heavy duty use.

In this embodiment, a series of vertical on edge panels 36, i.e. ⅜ inch plywood or other sturdy panel materials such as plastic or cardboard, are embedded in the core 38 of plastic foam. The panels 36 are cut to match the profile of the ramp 38 and are bonded to the intervening sections of plastic foam set on each side. This braces the panels 36 to greatly enhance the overall compressive strength of the ramp 34.

The core 38 and panels 36 are encased in a polyurea coating 40 in the above embodiments, which can be comprised as described above with a base coat 42 and top coat 44.

A carrying handle can be provided by bonding the ends of a nylon strap 46 to the polyurea coating 40 as shown on one side. Such handle can also extend across the rear side 48.

An intermediate duty ramp 50 is shown in FIGS. 7 and 8, which includes a single on edge panel 52 embedded in the center of the core 54. Another reinforced version can be provided by splitting the core lengthwise and coating abutting portions with polyurea.

This provides enhanced strength with minimal increased weights.

Other internal structures can be used, such as molded plastic shapes. However, it has been found in reinforced ramps made by the above described method are of adequate strength for many automobiles as vehicles up to 4800 pounds gross weight may be safely supported.

The invention claimed is:

1. A ramp comprising a core comprised of a parallelepiped substantially solid block of low density plastic foam with a front face at an entry end sloping from a bottom side to a substantially horizontal top surface; and a polyurea coating applied over the core to encase said core therein and substantially strengthen said core as well as providing a durable ramp surface.

2. The ramp according to claim 1 wherein said polyurea coating has a thickness on the order of 35–65 mils.

3. The ramp according to claim 1 wherein said low density plastic foam core is constructed of expanded polystyrene foam.

4. The ramp according to claim 1 wherein said polyurea coating has a top coat of polyurea applied thereto.

5. The ramp according to claim 1 wherein said core has a panel extending on edge between said top face and said bottom side embedded within said plastic foam block.

6. The ramp according to claim 5 wherein said core has a plurality of on edge sheets of spaced panels embedded in said low density plastic foam block.

7. The ramp according to claim 6 wherein a plastic, cardboard or plywood panel covers each side of said core.

8. The ramp according to claim 1 wherein said sloping front face is at an angle on the order of 10° from the bottom side.

9. The ramp according to claim 8 wherein said ramp is of a length ranging from about 5 feet to 6 feet.

10. The ramp according to claim 3 wherein said expanded polystyrene foam core is of a density ranging from 1 to 6 pounds per cubic foot.

* * * * *